(12) United States Patent  
Khojastepour

(10) Patent No.: US 9,124,360 B2  
(45) Date of Patent: Sep. 1, 2015

(54) DEGREES OF FREEDOM PER COMMUNICATION NODE

(71) Applicant: Mohammad Khojastepour, Lawrenceville, NJ (US)

(72) Inventor: Mohammad Khojastepour, Lawrenceville, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 14/561,171

(22) Filed: Dec. 4, 2014

(65) Prior Publication Data

US 2015/0200733 A1    Jul. 16, 2015

Related U.S. Application Data

(60) Provisional application No. 61/926,574, filed on Jan. 13, 2014.

(51) Int. Cl.
*H04B 7/00* (2006.01)
*H04B 15/00* (2006.01)
*H04B 7/04* (2006.01)

(52) U.S. Cl.
CPC .............. *H04B 15/00* (2013.01); *H04B 7/0456* (2013.01)

(58) Field of Classification Search
CPC .............................. H04B 15/00; H04B 7/0413
USPC ........................... 375/267, 347, 299; 370/275
See application file for complete search history.

(56) References Cited

U.S. PATENT DOCUMENTS

| | | | |
|---|---|---|---|
| 8,811,514 B2 * | 8/2014 | Huang et al. ................... | 375/267 |
| 8,811,552 B2 * | 8/2014 | Bayesteh et al. .............. | 375/346 |
| 2014/0003274 A1 * | 1/2014 | Clerckx et al. ................ | 370/252 |
| 2014/0036790 A1 * | 2/2014 | Normando et al. ........... | 370/329 |
| 2014/0098900 A1 * | 4/2014 | Bayesteh et al. .............. | 375/267 |

OTHER PUBLICATIONS

Cadambe and Jafar; "Interference Alignment and Degrees of Freedom of the K-User Interference Channel"; IEEE Transactions on Information Theory, vol. 54, No. 8, Aug. 2008.*

* cited by examiner

*Primary Examiner* — Qutbuddin Ghulamali
(74) *Attorney, Agent, or Firm* — Joseph Kolodka

(57) ABSTRACT

Systems and methods are disclosed to operate a communication network by dividing signal dimensions at a receiver into interference and intended signal dimensions; applying transmit precoding to mitigate interference by overlapping the interference from a plurality of transmitters into the interference dimension at the receiver; and applying a receiver filter to cancel out the interference dimension at the receiver and recover the signal in the intended signal dimension.

19 Claims, 3 Drawing Sheets

DEGREES OF FREEDOM PER COMMUNICATION NODE

This application claims priority to Provisional Application 61/926,574 filed Jan. 13, 2014, the content of which is incorporated by reference.

BACKGROUND

The classical definition of degrees of freedom (DoF) deals with the degree of a communication channel or multiple communication channels at the limit of high SNR. This can be interpreted as the number of independent streams that can be sent in each communication channel at high SNR regime.

Consider a point to point channel between a transmitter and a receiver both equipped with multiple antennas. It is well known that for independent Gaussian channel model between each pair of transmit and receive antennas the capacity of the corresponding multiple antenna input and multiple antenna output (MIMO) channel scales with the minimum of the number of antennas at the transmitter ($N_T$) and the receiver ($N_R$) at the limit of high SNR. The degrees of the freedom of the channel is then defined as the quantity $\min(N_T, N_R)$. The concept of degree of freedom may also be interpreted as the possibility or measure of the number of independent streams that can be transmitted simultaneously in the channel. It is immediate to see the usefulness of extending this concept in multiuser networks where we are interested to understand the number of simultaneous streams that can be transmitted between different transmit and receiver subset of the nodes in the network. For example, degrees of freedom in a three user interference channel with N antennas at each node is defined similarly as the scaling of the channel capacity between each pair of the users as a function of log(SNR). The same concept may be extended to define the three tuple $\underline{d}=(d_1, d_2, d_3)$ that can be achieved simultaneously, where $d_i$ denotes the scaling of the channel capacity between the $i^{th}$ transmitter and receiver pair. While there may be multiple choices of $\underline{d}$ achievable in this network the region of all such $\underline{d}$ defines the available degrees of freedom region.

SUMMARY

In one aspect, systems and methods are disclosed to operate a communication network by dividing signal dimensions at a receiver into interference and intended signal dimensions; applying transmit precoding to mitigate interference by overlapping the interference from a plurality of transmitters into the interference dimension at the receiver; and applying a receiver filter to cancel out the interference dimension at the receiver and recover the signal in the intended signal dimension.

In another aspect, systems and methods are disclosed to operate a communication network by grouping communication channels into interfering networks and intended data networks; determining degrees of freedom (DoF) per communication node where at a transmitting node the DoF is the number of independent dimensions for the transmission and at each receiver node the DoF is the number of independent dimensions for receiving data signals; separately dealing with interference in the network from communication in the intended data network through successive application of interference removal over partial interference network, and performing interference alignment in a cellular network and minimizing interference in single or multiple cells.

Advantages of the system may include one or more of the following. The system solves interference alignment issue which has particular importance in the context of cellular networks and the system can address interference in single or multiple cells especially when full duplex radios are possible to use. The use of full duplex in cellular systems can be done by characterizing the gain of using full duplex access point versus using half duplex access point. By exchanging HD APs to FD Aps, a doubling of the spectral efficiency is possible in single cell or 2-cell network with full cooperation between their access points. As we discussed the scalability of throughput in a wireless systems with multiple cells requires tight coordination between the access point. However, recent work have shown that global coordination and information exchange is not in fact necessary due to the fact that the interference is usually strong in a local vicinity and would not spread in the network globally. Therefore huge complexity and overhead of the global information exchange and the exhaustive burden of implementing a tight coordination between all access points can be replaced by coordination between neighboring cells that is much more manageable. We note that similar local coordination might be enough for the purpose of interference alignment particularly when full duplex access points are deployed.

BRIEF DESCRIPTION OF THE DRAWINGS

FIG. 1A shows FBIN(4,4) while FIG. 1B shows FBIN(4,3).

DESCRIPTION

Figure 1A:
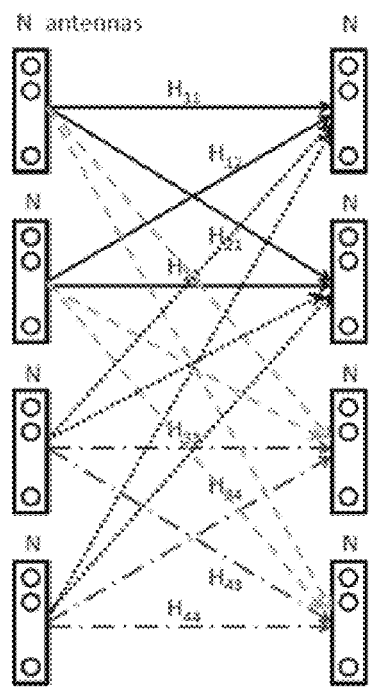
FIGS. 1A-1B show an exemplary Full Bipartite Interference Channel (FBIN)

We introduce the concept of DoF per communication node where at a transmitting node the DoF is the number of independent dimensions that can be used for the transmission and at each receiver node the DoF is the number of independent dimensions that can be used for receiving data signals. In general the communication channels or link in a network can be divided into two sets: the interfering channels and the intended channels; hence, the network may be considered as an overlay of two networks, respectively: the interfering network and intended data network. While in the classical form DoF is essentially a function of interfering network and is independent of the intended data network (as long as the networks are generic), the definition of DoF has been done for the channels in the intended data network. We illustrate a new interpretation of DoF that depends only on the interfering network and can be formalized in full generality based on degrees of freedom per nodes of the network. While the classical DoF has been studied only in the context of interference and X-channels, the per node DoF concept generalized the idea to other possible network. The system can express a set of new results on DoF for different networks and also make a connection to the classical definition of DoF defined in interference and X-channels.

Although the definition of DoF in general is a function of the actual channel gains, it is almost universally treated under generic or randomly generated channel conditions. As we discussed earlier, we do not consider symbol or channel extension, hence, we only consider space domain treatment of the signal where the channel coefficients are fixed. In practical scenarios, it means that we consider a fixed precoder at the transmitter and receive filters per block or multiple block of transmission within the channel coherence time where the channel coefficients are approximately constant. Consider an interference channel with K transmitting nodes indexed by 1, 2, and 3 and the corresponding receiving nodes denoted by 4, 5, and 6, respectively. The degrees of freedom corresponds to the rank of semi-orthogonal precoding matrices $V_i$ and receive filters $U_j$ such that the following condition holds $$U_j H_{ji} V_i = 0 \ \forall (i-j) \neq 0 (\text{mod } 3) \quad (1)$$

$$U_j H_{ji} V_i = d_i \ \forall (i-j) = 0 (\text{mod } 3) \quad (2)$$

where $U_j$ is a $d_j \times N_j$ matrix, $V_i$ is a $N_i \times d_i$ matrix and $N_i$ is the number of antennas at the node i. It is not hard to see that if the channel matrices $H_{ji}$ are generic satisfying the first set of conditions (1) is enough and the second conditions (2) are satisfied automatically.

This example reveals an important concept that the DoF in such a network is just a function of the interference network which is defined as a subset of the original network in which only the interfering links are present. In other word the desired communication or data intended network that consist of the channels over which the actual communication and signal transmission takes place ($H_{i+3,i}$ in the above example) does not play a direct role in the calculation of the DoF region in the network. This means that if we replace the data intended network with another network consisting of six links with the component channels $H_{i+6,i}$ the same DoF region is available if $N_{i+6} \geq N_i$. This observation can help us decouple the problem of finding the DoF region in a network based on considering a network as an overlay of two networks defined by 'interference network' and 'data intended network' into two parts. First, we find the DoF region in the interference network and then abstract the interference network by a network with potentially less number of antennas defined by the degrees of freedom in this network and ignoring the interference network in the second step. In the second step, the channel coefficients of the data intended network are adjusted based on the precoders and receiving filters obtained in the first step which leaves us with a network without any interference but with lower dimensions.

The definition of DoF in the interference network would change and depends on more parameters, in particular, each node may be denoted with a DoF per node and that defines the number of virtual antennas at this node. In a transmitting node the dimension of the precoder obtained as a solution to a given achievable DoF in the interference network defines its per node DoF and similarly at the receiving node the dimension of the receive filter does the same. Obviously, the classical definition of DoF per link in the network is still a function of the communication network as well. For example in the same 3-user interference channel we can consider a communication network that is defined as a multiple access channel from the transmitting nodes 1, 2, and 3 to a receiving node 7 denoted by the component channels $H_{7i}$, i=1, 2, 3 and a broadcast channel from a single point 8 to the receiving nodes 4, 5, and 6 denoted by the component channels $H_{i8}$, i=4, 5, 6. Clearly in this network the total DoF is a function of the number of antennas at the nodes 7 and 8 as well. Nonetheless, the treatment of the problem as two overlay networks of 'interference' and 'desired' network allows us to decouple the problem and also interpret the solution more easily. Also, it is possible to consider more general cases of the data intended network as illustrated in the above example which is beyond the classical form of definition of DoF that is generally considered in the context of classical interference channel and X-channels.

Degrees of Freedom per Node (DoF) is defined next. We formally define DoF per node in a communication network. Consider a network of L nodes equipped with $N_i$, i=1, 2, ..., L antennas that are either a transmitting node or a receiving node. The communication channel defined as an oriented graph of edges E on the set of nodes where the component channel between different nodes is assumed to be a Gaussian channel denoted by the channel coefficients matrix $H_{ji}$ with complex entries from the transmitting node i to the receiving node j. A component channel does not exist in the graph if its channel matrix is zero. The receive signal at a receiving node j is defined as $$y_j = \sum_{i \in T} H_{ji} x_i + z_j, \ \forall \ j \in R \quad (3)$$

where T is the set of transmitting node indices, R is the set of receiving node indices, $y_j$ is the received signal at the receiving node j, $x_i$ is the transmitting signal at the transmitting node i, and $z_j$ is the Gaussian noise at the receiver of node j.

The set of component channels are divided into two sets: a set D consisting of the data intended (or desired) communication link and its complement set I, ($I \cup D = E$ and $I \cap D = \emptyset$), that consist of the link that their output only causes interference at the receiving node and their corresponding signal does not carry any intended data to this node.

We say a vector of $\underline{d} = (d_1, \ldots, d_L)$ DoF per node for the nodes 1, ..., L is achievable if and only if there exist a set of transmit precoders $V_i$ of size $N_i \times d_i$ for the nodes $i \in T$ and a set of receive filters $U_j$ of size $d_j \times N_j$ for the receiving nodes $j \in R$ such that $U_j H_{ji} V_i = 0$ simultaneously. Please note that by definition a precoder and a receive filter is a full rank semi-orthogonal matrices.

The above definition of per node DoF is equivalent to the following: Let the interference network defined by the graph (T∪R,I) is amended with L links from the set E' one connected from each transmitting node $i \in T$ to a new node in T' and one link connected from a node in a set of new nodes R' to a different receiving node in R where the number of antennas of the new nodes are the same as the nodes that they are connected to. We say a vector of $\underline{d} = (d_1, \ldots, d_L)$ DoF per node for the nodes 1, ..., L is achievable if and only if there exist a coding scheme to which achieves the capacity scaling of $d_i$ log(SNR)+o(log(SNR)) simultaneously at the limit of high SNR for all the links in E' for the generic choice of all channels where channel extension is not allowed.

The above definition clarifies that once a vector of DOF per node $\underline{d}$ is achievable it is possible to remove the interference network from the original network and replace the number of antennas at each node to $d_i$ instead of $N_i$ and update the component channel coefficients by right and left multiplication with the corresponding precoder and receive filter of transmit and receive nodes of this component channel, respectively. this change would not affect the DoF in the reminder of the network that is defined as the desired network. We point out that our analysis is solely with respect to the DoF in the network and such reduction may affect the actual capacity region of the channel differently. In particular, even different solutions for the precoders and receiver filters that correspond to the same DoF per node may also affect the desired network in such a way that the achievable capacity or throughput in the desired network is different. Nonetheless, in terms of high SNR analysis the reduction obtained by the notion of DoF per node and removal of the corresponding interference network does not change the capacity scaling.

Figure 1B:
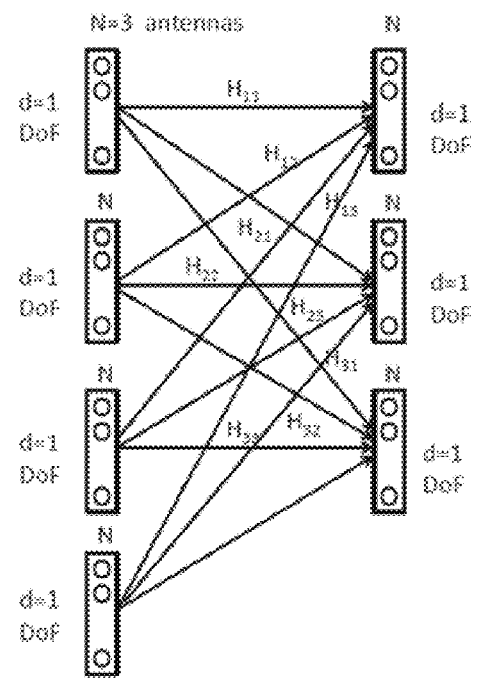

FIGS. 1A-1B show a Full Bipartite Interference Channel (FBIN): (a) FBIN(4,4) (b) FBIN(4,3). One may choose to apply the concept of DoF per node in a partial manner. Consider the problem of calculating an achievable DoF per node in an interference network defined as FBIN(4,4), depicted in FIG. 1(a), with N=4 antennas at each node, where FBIN(L,K) denotes a full bipartite interference network from a set of L transmitting nodes to a set of K receiving nodes with LK component channels between each pair of transmitting and receiving nodes. One may consider this network as the overlay of an interference network defined as a part of FBIN(4,4) consisting of two FBIN(2,2), one defined from the first two transmitting nodes to the first two receiving nodes, and the other defined from the last two transmitting point to the last two receiving points, with a desired network defined by the complement of this network. We can easily deduce that DoF per node of 2 is achievable for all nodes. Hence, we can remove the interference network and consider the network with only two antennas at each node and update the component channels respectively. Please note that for the generic choice of channel conditions, the channels remain generic with this update process. Now we have a network that consist of exactly two FBIN(2,2), one defined from the first two transmitting nodes to the last two receiving nodes and one from the last two transmitting points to the first two receiving nodes. Hence, it is immediate that DoF per node of one is achievable for all the nodes in this network which means that the same DoF per node is achievable for the original FBIN(4, 4). Please note that although it is convenient and in some cases useful to partially or successively apply the tools of calculating DoF per node and reducing the problem dimension gradually, the partial application of DoF may result in the loss in finding the DoF for the original network. For example, in FBIN(4,4) with only N=3 antennas at each node DoF per node of 1 is achievable and with N=4 higher DoF per node is achievable. For example, it can be shown that DoF per node of 2 for two transmitting nodes and DoF per node of 1 for all other nodes are achievable for FBIN(4,4) with N=4 antennas per node. A more interesting result is that in FBIN(4,4) with N=3 antennas per node DoF per node of 1 is achievable. We consider the orientation for the edges of the network which goes from the first two transmitter with precoders $V_1, V_2$ to the first two receiver with receive filters $U_1, U_2$. Then a reciprocal channel that goes from the first two receiving nodes with the precoders $U_1, U_2$ (receive filters in the original direction) to the last two transmitting nodes with the receive filters $V_3, V_4$ (that are the precoders in the original directions). Next, the channel from the last two transmitting nodes with precoders $V_3, V_4$ to the last two receiving nodes with the receive filters $U_3, U_4$ and finally the reciprocal channel from the last two receiving nodes with precoders $U_3, U_4$ to the first two transmitting nodes with precoders $V_1, V_2$. Then, 1. $U_j = H_{j1} V_1 \times H_{j2} V_2$, if $1 \le j \le 2$;
2. $U_j = H_{j1} V_3 \times H_{j4} V_4$, if $3 \le j \le 4$;
3. $V_i = H_{1i}^* U_1 \times H_{2i}^* U_2$, if $3 \le i \le 4$;
4. $V_i = H_{3i}^* U_3 \times H_{4i}^* U_4$, if $1 \le i \le 2$.

where '×' is the standard curl operation between two vectors and H* denotes the channel reciprocal to channel H. For example the conditions (i) states that the space represented by $U_j$ is a one dimensional space that is orthogonal to the two dimensional space defined by the vectors $H_{j1} V_1$ and $H_{j2} V_2$, etc.

Putting together, we get

1. $V_i = H_{1i}^* (H_{11} V_1 \times H_{12} V_2) \times H_{2i}^* (H_{21} V_1 \times H_{22} V_2)$, if $3 \le i \le 4$;
2. $V_i = H_{3i}^* (H_{33} V_3 \times H_{34} V_4) \times H_{4i}^* (H_{43} V_3 \times H_{44} V_4)$, if $1 \le i \le 2$.

We can simplify this further and get an equation only involving $V_1$ and $V_2$ which can be directly solved. Then, we find $U_1, U_2$ from (i), $V_3, V_4$ from (iii), and finally $U_3, U_4$ from (ii). This is a direct construction of one dimensional precoders and receive filters that satisfy the interference alignment condition and shows per node DoF 1 is achievable for all nodes.

Next, a Symmetric Interference Network with Asymmetric DOF is detailed. Let us consider a 3-user interference channel with $T=\{1,2,3\}$, $R=\{4,5,6\}$ where the node i intends to communicate with the node i+3, i.e., $D=\{(1,4), (2,5), (3,6)\}$ and the number of antennas at all nodes is N=3. It is known that the DoF equal to 1 for all three links in D is achievable. Here we argue that one can achieve total DoF of 4 over all three links. let us consider the partial interference network defined by $I' = \{(1,5), (1,6), (2,6), (3,5)\} \subset I = T \times R - D$. We argue that the vector $\underline{d} = (2,2,2,3,1,1)$ DoF per node is achievable in this interference network. Consider an arbitrary precoder $V_1$ of size 3×2 which defines a two dimensional space as an input to either of the channels from node 1 to nodes 5 and 6. Since N=3 at each of the nodes 5 and 6 there is at least one vector (channels are generic) that is orthogonal to the received signal from node 1 based on which We define the receive filters $U_5$ and $U_6$ as a 1×3 dimensional vector. Now consider the input to the node 2 that lies in a 3 dimensional space. This input should avoid generating an output at the node 6 that corresponds to the vector defined by $U_6$. So for generic choices of the channels there is a two dimensional space defined for example by the basis corresponding to the columns of $V_2$ that does not produce any vector corresponding to $U_6$ at the node 6. Similar arguments holds for the node 3 by considering the only interfering link out of this node that goes to node 5.

Next, we can consider the rest of the interfering network by omitting the links I and replacing the number of antennas at the nodes 1, 2, ... 6 by the corresponding DoF per nodes, i.e., 2, 2, 2, 3, 1, 1, respectively. We note that the interfering network in this case consists of only two links $I'' = I - I' = \{(2,4), (3,4)\}$. Considering the fact that the modified number of antennas at the node 2,3, and 4, are equal to 2, 2, and 3, it is simple to see that DoF per node of 1, 1, and 2 is achievable. This completes the proof of showing that DoF per node of (2,1,1,2,1,1) is achievable.

Considering the desired network defined by the edges in D, it can be deduced that the DoF for each link is the minimum of per node DoF of the nodes at the two ends of this link which means for the first link DoF is equal to 2 and for the other two links the DoF is equal to one for the total of 4 DoF for all three communication links in this network.

It is also possible to show a vector of (2,2,2,1,1,1) DoF per node is achievable which is an asymmetric in terms of the total transmit and receive degrees of freedom in the network. Hence, considering the desired network to be defined by the set of edges in D defined above the DoF per communication link remains to be one for all the three links. However, considering a different desired network defined by $D_1 = \{(1,7),(2,7),(3,7),(8,4),(8,5),(8,6)\}$ with node 8 as transmitter and node 7 as receiver overlayed on top of the same interference network I it is easy to see that total DoF for the entire communication links in the network is equal to 6 in the uplink channel from nodes 1,2, and 3 to node 7 and it is equal to 3 for the downlink channel from node 8 to node 4, 5, and 6 for the total of 9 DoF.

Next an Asymmetric Interference network is discussed. Here we consider an asymmetric interference network with three transmitters T={1,2,3} and four receivers R={4,5,6,6} and all the interchannels between every transmitter to the receiver. This channel is reciprocal to the channel depicted in FIG. 1(b). We assume that all nodes have 3 antennas. Here, we only focus on the interference network without a particular desired network and we would like to find an achievable DoF per node for this interference network. first let us define a partial interference network that consist of the edges between the first 6 nodes of the network and does not include the edges I'={(1,7), (2,7), (3,7)}. It was seen that DoF per nodes of (2,2,2,1,1,1) is available for the nodes 1 to 6 and since node 7 is an isolated node in this partial interference network without connection to any other node it is immediate that the vector of achievable DoF per node in the partial interference network is (2,2,2,1,1,1,3). Now, by reducing the interference network to a network with (2,2,2,1,1,1,3) antennas per nodes 1 to 7 and with the edges defined by I' we can see that the problem reduces to finding DoF per node in a multiple access network with three transmitting nodes with two antenna each to a single destination with 3 antennas which is very simple to see that DoF of one per communication node is possible. Hence DoF of 1 for the original network with three transmit and four receive antennas with channels connecting every pair of transmit and receive nodes is achievable.

Figure 2:
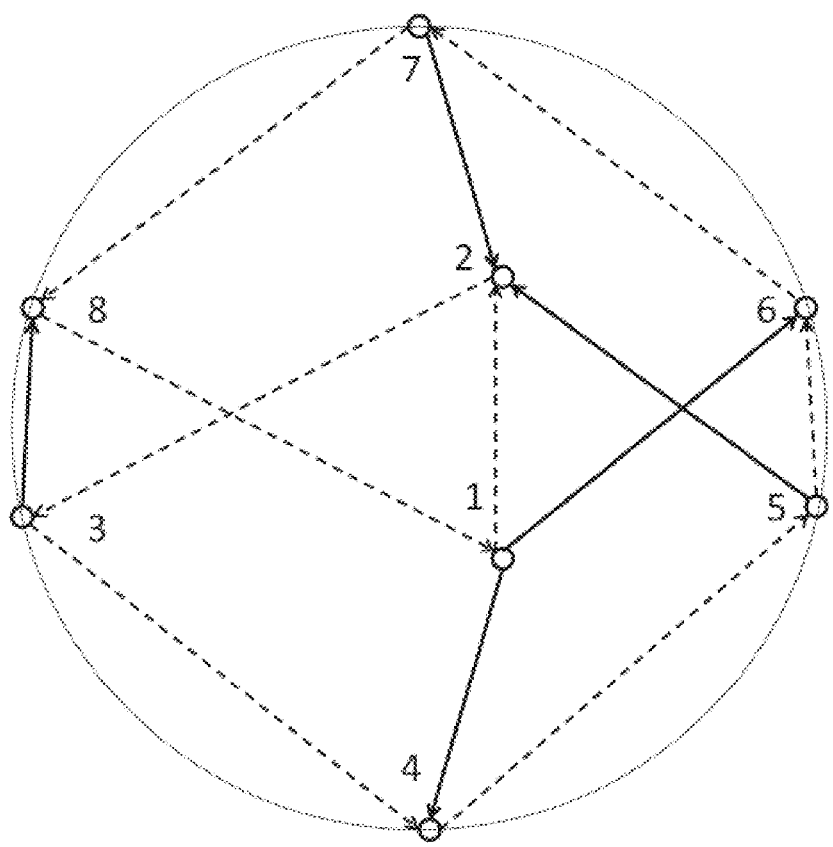
FIG. 2 shows an example of a communication network divided into an interference network overlayed with a desired communication network comprising of a MAC, a BC, and a single link.

The Interference Network can be Overlayed with MAC and BC. FIG. 2 shows an example of a communication network divided into an interference network overlayed with a desired communication network comprising of a MAC, a BC, and a single link. Consider a communication network depicted in FIG. 2 consisting of 4 transmitting nodes labeled as 1, 3, 5, and 7 communicating with 4 receiving nodes labeled as 2, 4, 6, and 8 that are located in a area and border of a disk. The communication channel between a pair of transmitter and receiver is assumed to be independent fading (satisfying generic channel condition) with the average channel gain based on the distance between the node. The nodes consider to be out of the interference range if the distance between the nodes is larger than, e.g., ¾ of the diameter of the disk. Hence, for the network topology depicted in FIG. 2 the nodes 4, 6, and 8 are out of the range to receive an interference from the nodes 7, 3, and 5, respectively. We define the desired communication network as a combination of (i) a broadcast channel (BC) from node 1 to nodes 4 and 6, (ii) a multiple access channel (MAC) from the nodes 5 and 7 to node 2, and (iii) a single link channel from node 3 to node 8. The communication received from a transmitting link in all other links beside the ones in the desired communication network is considered to be interference and the corresponding link define the interference network that consist of the links (1,2), (3,2), (3,4), (5,4), (5,6), (7,6), (7,8), and (1,8). Assume that each nodes has 4 antennas. The nodes can achieve DoF per node of 2 in this interference network. The solution can be obtained as follows. The precoders $V_1, V_3, V_5, V_7$ must satisfy the following equations where $$\underline{\underline{s}}$$

means that the vector spaces defined by the column of the matrices in the left and right of this operator have to be the same (have same span).

$$H_{21}V_1^s = H_{23}V_3 \qquad (4)$$

$$H_{43}V_3^s = H_{45}V_5 \qquad (5)$$

$$H_{65}V_5^s = H_{67}V_7 \qquad (6)$$

$$H_{87}V_7^s = H_{81}V_1 \qquad (7)$$

Hence, it is enough to have $$V_1^s = H_{21}^{-1}H_{23}H_{43}^{-1}H_{45}H_{65}^{-1}H_{67}H_{87}^{-1}H_{81}V_1 = H_c V_1 \qquad (8)$$

which means that the columns of $V_1$ should be the eigenvectors of the matrix $H_c$. Hence, we can simply pick any two eigenvectors of the matrix $H_c$ to form the precoding matrix $V_1$. The precoders $V_3$, $V_5$, and $V_7$ are then obtained successively based on the above equations. Finding the receive filters are also very easy once the transmit precoders are fixed. The above construction does not limits the number of eigenvectors that can be picked, however, the space of the receive filters would decrease as we increase the size of the space of the precoders. For example by picking 3 eigenvectors to form $V_1$, the other precoder also would be equivalent to a 3-dimensional subspace which then limits each of the receive filter to lie in a 1-dimensional space which translates to the achievable vector of DoF per node (3,1,3,1,3,1,3,1).

Having DoF per node of 2 for all nodes, we can now eliminate the interference network and focus on the desired communication network. For example an interesting observation here could be the fact that in the MAC channel part of this network, no more than two streams can be decoded, but it is possible to use precoders at the transmitting nodes to optimize the rate. We note that the design of the precoders depends on the updated channels from the nodes 5 and 7 to node 2 which is composed of two 2×2 channels.

A Full Bipartite Interference Network (FBIN) is detailed next. In this section we address an example of interference networks that is practically useful in cellular networks where FD access points are employed. Recent results on the development of the practical techniques to enable full duplex shows that the use of single band full duplex communication systems in order to potentially double the spectral efficiency is one of the major research topics in the future of our wireless communications. Although several implementation of the single link full duplex (FD) systems has been reported in the past few years one of the major limiting factor in the deployment and further development of these systems has been identified as the limitation of having mixture of uplink and downlink users in a single cell that are working in the same band. In particular even though a well designed and sophisticated approach can be used at the basestations or access points (APs), an uplink user generates an interference in nearby downlink clients that are working in the same band. Hence, until the problem of uplink interference on downlink users is not properly addressed, the potential doubling of spectral efficiency is not possible in multi-user systems and particularly in single cell wireless communication systems.

As a part of our contribution, we use concept of 'DoF per communication node' to provide results on single cell equipped with full duplex access points. In contrast to the prior results on limited performance of using FD in single cell, we provide a very optimistic results that shows the doubling of spectral efficiency is still possible by using FD access points in comparison to half duplex (HD) access points with proper design of interference alignment scheme. We further show that a simple selection of four users, two in the uplink and two in the downlink, may suffice to achieve the full potential of the full duplex system. This simple example has a very important practical consideration in which the overhead of implementing the interference alignment and calculation of precoders and receiver filters is considered. It goes without saying that increasing the number of channels that need to be estimated and fed back as well as the forward signaling of the precoders and receive filters within the coherence time of the channel could be a very important practical consideration and hence limiting the number of users required to theoretically attain the full benefit of a FD AP is an important factor.

Figure 3A:
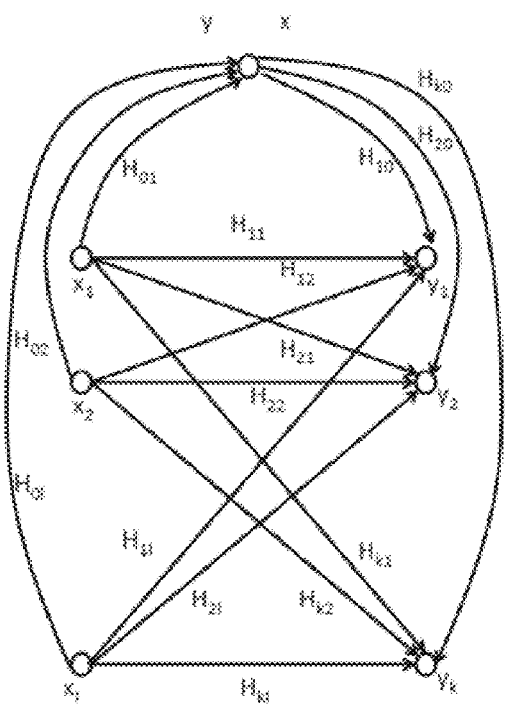
FIGS. 3A-3B show an exemplary Single Cell Channel with FBIN and a desired network with a MAC and a BC.

Interference alignment in FBIN is handled next. FIG. 3 shows a Single Cell Channel: consists of FBIN and a desired network comprising of a MAC and a BC. For practical reason, we focus on the interference alignment in space domain where the channel coefficients are fixed. We consider a fixed precoder per block or multiple block of transmission within the channel coherence time where the channel coefficients are approximately constant. As shown in FIG. 3(a), we consider a FBIN(L,K) with L transmitting nodes labeled as $(i,t) \in T$, $i= 1, \ldots, L$ and K receiving nodes labeled as $(j,r) \in R$ where subindexes t and r denote the transmitting and receiving nodes, respectively. we consider transmit precoding matrix $V_i$, $i=1, 2, \ldots, L$ at each transmission node and a receiver filter or a receive precoding matrix $U_j$, $j=1, 2, \ldots, K$ at each receiving node. The transmit precoding matrices $V_i$ are of dimension $N_{t,i} \times d_{t,i}$ where $d_{t,i} \leq N_{t,i}$ and receive filters $U_j$ are of dimension $d_{r,j} \times N_{r,j}$ where $d_{r,j} \leq N_{r,j}$. The alignment conditions are given by $$U_i H_{ij} V_j = 0 \ \forall i=1,2,\ldots,L, \text{ and } j=1,2,\ldots,K \quad (9)$$

where $H_{ji} \in I$ denotes the component channels of the interference network from node i to node j. We note that the alignment conditions may be written in terms of rows of $U_i = [u_i^1 u_i^2 \ldots u_i^{d_{r,i}}]^T$ and the columns of $V_j = [v_j^1 v_j^2 \ldots v_j^{d_{r,j}}]$. This means that all vectors $u_i^a$ and $v_j^b$ for a given i and j and for all indices a and b satisfy similar equations $$u_i^a H_{ij} v_j^b = 0 \quad (10)$$

This condition reveals two necessary conditions immediately. First, the degrees of freedom of a receiving node j that is the number of independent vectors $v_j^b$, cannot be more than the dimension of the vector space that contains this vector, hence $d_{t,j} \leq Nt,j$. Similarly, for $u_i^a$ we have $d_{r,i} \leq Nr,i$ that is the second necessary condition. There are two more conditions that can be deduced from (10). The third necessary condition is given by $d_{r,i} + d_{t,j} \leq \max N_{r,i}, N_{t,j}$. This is true due to the fact that if $N_{r,i} \leq N_{t,j}$ for a given i and j all vectors $H_{ij} v_j^b$ have to be linearly independent since $H_{ij}$ is generic and furthermore they are orthogonal to all $u_i^a$ which means that the total number of such vectors are less than the dimension of the vector $u_i^a$ that is $N_{r,i}$.

The fourth necessary condition may be obtained by counting the number of scalar variables and scalar equations or constraint that the variable have to satisfy. The intuition obtained from the linear algebra is that a system of linear equation most likely does not have a solution if the number of variables are less than the number of constraint is the coefficients of the equations are generic. Although the formulation based on the DoF per node is slightly different, this counting argument for DoF in classical interference channel has been presented by several prior work and has been shown to be a necessary condition. The number of variables in a subset of equations S between the transmit and receiving node pair j) is given by $\Sigma_{i:(i,j) \in S} d_{t,i}(N_{t,i} - d_{t,i}) + \Sigma_{j:(i,j) \in S} d_{r,i}(N_{r,i} - d_{r,i})$ where $$S \subseteq M = \{(i,j), 1 \leq i \leq L, 1 \leq j \leq K\} \quad (11)$$

On the other hand, the number of scalar equation in the same set S is given by $\Sigma_{i,j:(i,j) \in S} d_{t,i} d_{r,j}$. Therefore the fourth necessary condition is given by $$\sum_{i:(i,j) \in S} d_{t,i}(N_{t,i} - d_{t,i}) + \sum_{j:(i,j) \in S} d_{r,i}(N_{r,i} - d_{r,i}) \geq \sum_{i,j:(i,j) \in S} d_{t,i} d_{r,j} \ \forall S \subseteq M \quad (12)$$

The DoF per node for FBIN is discussed next. Let us consider a single cell wireless communication network with an access point (AP) indexed as node 0 and collection of L uplink and K downlink users where the desired network consists of (i) a multiple access channel from all uplink nodes to the AP and (ii) a broadcast channel from the AP to all downlink nodes. The interference network consists of all the channels between the uplink and downlink users that can be modeled as a FBIN(L,K).

Figure 3B:
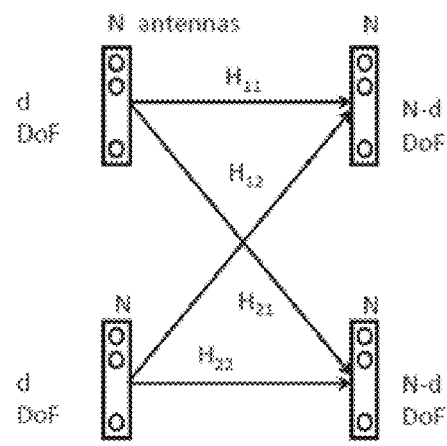

First, we note that in this model with a FD AP with N transmit and N receive RF chains the total DoF is given by $$DoF_{FD} = \min\left(N, \sum_{i=1}^{L} d_{t,i}\right) + \min\left(N, \sum_{i=1}^{K} d_{r,i}\right) \quad (13)$$

where and $d_{t,i}$, $i=1, \ldots, K$, and $d_{r,i}$, $i=1, \ldots, K$ are the per node DoF at the transmitting and receiving nodes, respectively. The proof relies on the fact that (i) by removing the FBIN and replacing the number of antennas at each node with its per node DoF we are only left with the desired network that consists of two separate MAC and BC, and (2) the DoF for a MAC or BC is the minimum of the number of antennas at the AP and the sum of DoF of its users. On the other hand if the AP is only HD with N antennas, then the total DoF can be found for either uplink (UL) or downlink (DL) as $$DoF_{HD,UL} = \min\left(N, \sum_{i=1}^{L} d_{t,i}\right), \quad (14)$$

$$DoF_{HD,DL} = \min\left(N, \sum_{i=1}^{K} d_{r,i}\right), \quad (15)$$

respectively.

second, we show that in a FBIN(2,2) channel (FIG. 3(b)) with N antenna at each node DoF per node equal to d, d≤N for all uplink users and N−d for all downlink users is simultaneously achievable. Let $V_1$ and $V_2$ be the transmit precoder of size N×d and $U_1$ and $U_2$ be the receive filters of size N×(N−d). The following has to be satisfied.

$$U_i H_{ij} V_j = 0 \ \forall i=1,2, \text{ and } j=1,2 \quad (16)$$

We select $V_1$ and $V_2$ such that $$(H_{11} V_1)^S = H_{12} V_2$$

in order to align the interferences of both transmitting nodes into the same space of size N×d dimensions at the receiving node (1,r). Such selection is easy as for any choice of the precoding matrix $V_1$, the precoding matrix $V_2$ can be obtained by choosing $V_2 = H_{12}^{-1} H_{11} V_1$ where for random matrices $H_{ij}$ this can be done with probability 1. In order to align the interferences of both transmitter to the receiving node 2, we must have $H_{21} V_1^S = H_{22} V_2$, hence it is enough to have $V_1^S = H_{21}^{-1} H_{22} H_{12}^{-1} H_{11} V_1$). This means that can be composed of any d eigenvectors of the matrix $H_{21}^{-1} H_{22} H_{12}^{-1} H_{11}$ and $V_2 = H_{12}^{-1} H_{11} V_1$. Under these conditions the space of signals at both receiving nodes is limited to a d dimensions and hence there exist N−d orthogonal dimensions at each receiving nodes which is used to construct N×(N−d) dimensional receive filters $U_1$ and $U_2$.

While the above argument shows that the total sum of per node DoF in a FBIN(2,2) with N antennas at each node can be equal to 2N the following argument shows that in fact this is the maximum value that this sum can take. Let $d_{t,i}$ and $d_{r,i}$, i=1,2 denote the degrees of freedom of transmitting nodes and receiving nodes, respectively. Using the counting argument (??), we have $$\sum_{i=1}^{2} d_{t,i}(N - d_{t,i}) + d_{r,i}(N - d_{r,i}) \geq \sum_{i=1}^{2} \sum_{i=1}^{2} d_{t,i} d_{r,j} \qquad (17)$$

Rearranging the above inequality, the following should hold $$(d_{t,1} + d_{t,2} + d_{r,1} + d_{r,2})N \geq \sum_{i=1}^{2} d_{t,i}^2 + \sum_{i=1}^{2} d_{r,i}^2 + \sum_{i=1}^{2} \sum_{i=1}^{2} d_{t,i} d_{r,j} \qquad (18)$$

$$\geq \sum_{i=1}^{2} d_{t,i}^2 + \sum_{i=1}^{2} d_{r,i}^2 + \sum_{i=1}^{2} \sum_{i=1}^{2} d_{t,i} d_{r,j} - (d_{t,1} - d_{t,2})^2 - (d_{r,1} - d_{r,2})^2 \qquad (19)$$

$$\geq \frac{1}{2}(d_{t,1} + d_{t,2} + d_{r,1} + d_{r,2})^2 \qquad (20)$$

Hence, we have $$(d_{t,1} + d_{t,2} + d_{r,1} + d_{r,2}) \leq 2N \qquad (21)$$

Comparing a the total number of streams that can be simultaneously transmitted in a single cell with FD versus HD AP, one can conclude that it is possible to achieve twice the number of streams with FD AP for a total of 2N streams versus only N streams with HD AP (when N is an even number). Furthermore, to achieve this spectral efficiency gain it is enough to select only two uplink and two downlink users. This is a very optimistic results which shows that using an interference alignment can restore the promised doubling gain of using FD versus HD radios in a multi-user communication systems such as a single cell wireless systems.

The maximum sum of the per node DoF in a FBIN(K,K) channel with a symmetric d DoF per node and N antenna at each node is $$2K \left\lfloor \frac{2N}{K+2} \right\rfloor.$$

We use the counting argument that is a necessary condition. We have $$\sum_{i=1}^{K} d_{t,i}(N - d_{t,i}) + d_{r,i}(N - d_{r,i}) \geq \sum_{i=1}^{K} \sum_{i=1}^{K} d_{t,i} d_{r,j} \qquad (22)$$

$$2Kd(N - d) \geq K^2 d^2 \qquad (23)$$

$$d \leq \frac{2N}{K+2} \qquad (24)$$

we have 2K nodes each with degrees of freedom less than or equal to $$\frac{2N}{K+2}$$

that will add up to $$2K \left\lfloor \frac{2N}{K+2} \right\rfloor.$$

This means that for large enough K this total sum tends to 4N. Although the construction of a solution to achieve this bound is beyond the scope of this paper, this bound is in fact achievable. The implication of this result is as follows. Consider two adjacent cells where the access points have complete cooperation (e.g. using joint transmission in practical systems that are enabled with cooperative multipoint transmission (CoMP)). The two APs have complete cooperation hence there is no interference between them and furthermore they can use network MIMO which means they can be viewed as a virtual AP with 2N antennas. The uplink users may generate interference to the downlink users in their own cell as well as the adjacent cells. Considering the set of all uplink users and downlink users, the interference network is a FBIN in which total sum of 4N per node DoF is achievable. Hence two FD APs can simultaneously serve 4N streams while replacing them with two HD APs we can only serve 2N streams. Of course this result is asymptotic and requires large number of users to be selected that are properly split between the cells as well as uplink and downlink. Nonetheless, it is very interesting to observe that even in multi-cell systems (2-cells) the promised doubling of the spectral efficiency might still be achievable, at least in theory. Since this topic is out of the scope of this paper we do not make further discussion and just point out that this scaling will slow down for larger number of cells and would not remain as a factor of two when the number of cells are more than two.

In sum, the system handles degrees of freedom (DoF) in the network. Classically DoF is defined for collection of independent links in the network. In contrast we introduce DoF per nodes. Furthermore, we introduce the technique of dividing a network into an interference network and a desired communication network, where the former consists of the links over which the actual data transmission is performed and the latter consists of the link that do not carry information and only cause interference to their corresponding receivers. We tied back our definition of per node DoF to the classical concept of DoF and further showed its usefulness in several new areas and problems, including simpler interpretation of DoF, separation of dealing with interference in the network from communication in the desired network, successive application of interference removal by applying the technique over partial interference network, and considering several new scenarios of interference alignment problem particularly in the form of full bipartite interference network.

The problem of interference alignment in FBIN has particular importance in the context of cellular networks and dealing with interference in single or multiple cells especially when full duplex radios are possible to use. As we discussed the scalability of throughput in a wireless systems with multiple cells requires tight coordination between the access point. However, recent work have shown that global coordination and information exchange is not in fact necessary due to the fact that the interference is usually strong in a local vicinity and would not spread in the network globally. Therefore huge complexity and overhead of the global information exchange and the exhaustive burden of implementing a tight coordination between all access points can be replaced by coordination between neighboring cells that is much more manageable. We note that similar local coordination might be enough for the purpose of interference alignment particularly when full duplex access points are deployed.

The use of full duplex in cellular systems can be done by characterizing the gain of using full duplex access point versus using half duplex access point. By exchanging HD APs to FD Aps, a doubling of the spectral efficiency is possible in single cell or 2-cell network with full cooperation between their access points.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method to operate a communication system, comprising:
   dividing signal dimensions at a receiver into interference and intended signal dimensions;
   applying transmit precoding to mitigate interference by overlapping the interference from a plurality of transmitters into the interference dimension at a receiver;
   applying a receiver filter to cancel the interference dimension at the receiver and recover the signal in the intended signal dimension;
   grouping communication channels into interfering networks and intended data networks;
   determining degrees of freedom (DoF) per communication node where at a transmitting node the DoF is the number of independent dimensions for the transmission and at each receiver node the DoF is the number of independent dimensions for receiving data signals;
   separately dealing with interference in the network from communication in the intended data network through successive application of interference removal over partial interference network, and
   performing interference alignment in a cellular network and minimizing interference in single or multiple cells.

2. The method of claim 1, wherein degrees of freedom per node for a receiver node is defined as the size of intended signal dimension and transmit precoding provides overlapping interference signal at each the intended signal dimensions of plurality of receivers.

3. The method of claim 2, wherein degrees of freedom per node for a transmit node is defined as the size of transmit signal dimension or rank of transmit precoding matrix.

4. The method of claim 3, wherein at least for one node, the degree of freedom per node is different from that of another node.

5. The method of claim 3, wherein at the degrees of freedom per transmit nodes are selected such that the degrees of the freedom per node is non-zero at least for one receiver node.

6. The method of claim 5, wherein at least one of the transmitting user or receiving user is working in half-duplex mode.

7. The method of claim 2, comprising partially applying DoF per node in an interference network where FBIN(L,K) denotes a full bipartite interference network from a set of L transmitting nodes to a set of K receiving nodes with LK component channels between each pair of transmitting and receiving nodes.

8. The method of claim 2, wherein the interference network is symmetric with asymmetric DoF.

9. The method of claim 8, comprising considering a partial interference network and determining the DoF per node for the interference network and considering the rest of the interfering network by omitting predetermined links and replacing the number of antennas by the corresponding DoF per node.

10. The method of claim 2, comprising determining an asymmetric interference network.

11. The method of claim 10, comprising considering a partial interference network and determining the DoF per node for the interference network in a multiple access network.

12. The method of claim 2, comprising determining an interference network overlayed with a multi-access channel (MAC) and broadcast channel (BC) and a link.

13. The method of claim 12, comprising considering a partial interference network and determining the DoF per node to eliminate the interference network.

14. The method of claim 2, comprising considering a full bipartite interference network (FBIN) and determining the DoF per node for the interference network on single cell equipped with full duplex access points.

15. The method of claim 14, comprising analyzing an FBIN(L,K) with L transmitting nodes labeled as $(i,t) \in T$, $i=1, \ldots, L$ and K receiving nodes labeled as $(j,r) \in R$ where subindexes t and r denote the transmitting and receiving nodes, respectively, a transmit precoding matrix $V_i$, $i=1, 2, \ldots, L$ at each transmission node and a receiver filter or a receive precoding matrix $U_j$, $j=1, 2, \ldots, K$ at each receiving node, wherein the transmit precoding matrices $V_i$ are of dimension $N_{t,i} \times d_{t,i}$ where $d_{t,i} \leq N_{t,i}$ and receive filters $U_j$ are of dimension $d_{r,j} \times N_{r,j}$ where $d_{r,j} \leq N_{r,j}$, comprising determining alignment conditions as $U_j H_{ij} V_i = 0 \; \forall i=1,2,\ldots,L, \text{ and } j=1,2,\ldots,K$ where $H_{ji} \in I$ denotes the component channels of the interference network from node i to node j.

16. The method of claim 15, wherein vectors $u_i^a$ and $v_j^b$ for a given i and j and for all indices a and b satisfy: $u_i^a H_{ij} v_j^b = 0$.

17. The method of claim 15, wherein the communication network includes a single cell wireless communication network with an access point (AP) indexed as node 0 and collection of L uplink and K downlink users where the intended data network includes a multiple access channel from all uplink nodes to the AP and a broadcast channel from the AP to all downlink nodes and the interference network includes channels between the uplink and downlink users modeled as a FBIN(L,K) and an FD AP with N transmit and N receive RF chains, comprising determining total DoF $$DoF_{FD} = \min\left(N, \sum_{i=1}^{L} d_{t,i}\right) + \min\left(N, \sum_{i=1}^{K} d_{r,i}\right)$$

where $d_{t,i}$, i=1, ..., L, and $d_{r,i}$, i=1, ..., K are the per node DoF at transmitting and receiving nodes.

18. The method of claim 1, wherein the number of transmitting nodes is not equal to the number of receiving nodes.

19. The method of claim 1, comprising considering a full duplex access point communicating with at least one transmitting user in uplink and at least one receiving users in downlink in full duplex mode.

* * * * *